United States Patent [19]

Susor

[11] 4,258,810
[45] Mar. 31, 1981

[54] WEIGHING APPARATUS

[75] Inventor: William C. Susor, Westerville, Ohio

[73] Assignee: Masstron Scale, Inc., Columbus, Ohio

[21] Appl. No.: 42,352

[22] Filed: May 25, 1979

[51] Int. Cl.³ .......................................... G01G 21/02
[52] U.S. Cl. .................................. 177/128; 177/134; 177/253; 177/DIG. 9
[58] Field of Search ............... 177/134, 135, 133, 128, 177/DIG. 9, 255, 253, 211

[56] References Cited

U.S. PATENT DOCUMENTS

| 2,901,235 | 8/1959 | Bradley | 177/211 |
| 4,134,467 | 1/1979 | Czyryk | 177/133 |

Primary Examiner—Joseph W. Hartary
Attorney, Agent, or Firm—Yount & Tarolli

[57] ABSTRACT

An improved weighing apparatus includes a load receiving platform which is supported by a plurality of load cells. Each of the load cells has a downwardly facing recess in which a floating pin is received. The pin has a relatively large base which engages a floor or support surface and an upwardly projecting mounting section which extends into the recess in the load cell. The pin has an arcuate upper surface which enables tilting movement to occur between the pin and the load cell to compensate for uneven floors. In order to compensate for shifting movement of the platform relative to the floor due to thermal expansion and other causes, the base of the floating pin is movable along the floor. The mounting section of the pin is held in the recess in the load cell by a retainer plate which is fixedly connected with the load cell.

5 Claims, 4 Drawing Figures

WEIGHING APPARATUS

BACKGROUND AND FIELD OF THE INVENTION

This invention relates to a new and improved weighing apparatus and more specifically to a weighing apparatus having load cells with pins which transmit force between the load cells and a support surface.

A known weighing apparatus includes a rectangular platform which is received in a frame which may be disposed in a shallow pit. A load cell is provided at each of the four corners of the platform to provide output signals indicative of the weight of a load which is disposed on the platform.

When the platform of this known weighing apparatus is placed in the frame, downwardly facing recesses in the load cells must be lined up with upwardly projecting support pins. If the pins are not accurately aligned with the load cells, it is necessary to shift the pins slightly in order to move them into alignment with the recesses in the load cells. Due to the small amount of space between the edges of the platform and the frame, difficulty can be encountered in moving the pins into alignment with the recesses in the load cells. Of course, this difficulty increases as the weight of the platform increases and the amount of space between the platform and the frame decreases.

SUMMARY OF THE PRESENT INVENTION

The present invention relates to a new and improved weighing apparatus having a platform with at least one load cell connected thereto. Each load cell has a downwardly facing recess in which a force transmitting member is received. If a plurality of load cells are connected to the platform, one of the force transmitting members would be fixed to a support, the other or others would constitute floating pins. A floating pin has a relatively large base or pressure pad which directly engages a support surface and is slidable along the support surface to accommodate shifting movement of the platform relative to the support surface. In addition, the floating pin has an arcuate upper surface which abuttingly engages the bottom of a recess in a load cell to accommodate tilting movement between the load cell and the pin.

In accordance with one feature of the present invention, a retainer member is provided to hold a mounting section of the floating pin in the downwardly facing recess in the load cell when the base of the pin is spaced from a support surface. This eliminates the necessity of aligning the pins with the recesses in the load cells during installation of the platform in the frame.

Accordingly, it is an object of the present invention to provide a new and improved apparatus for use in weighing a load and wherein the apparatus includes a load cell having a downwardly facing recess and a floating pin or force transmitting member which is held in the recess by a retainer connected with the load cell.

Another object of this invention is to provide a new and improved weighing apparatus which includes a platform and a plurality of load cells, each of which has a downwardly facing recess in which a force transmitting member or pin is held by a retainer.

BRIEF DESCRIPTION OF THE DRAWINGS

The foregoing and other objects and features of the present invention will become more apparent upon a consideration of the following description taken in connection with the accompanying drawings wherein.

DESCRIPTION OF ONE SPECIFIC PREFERRED EMBODIMENT OF THE INVENTION

Figure 1:
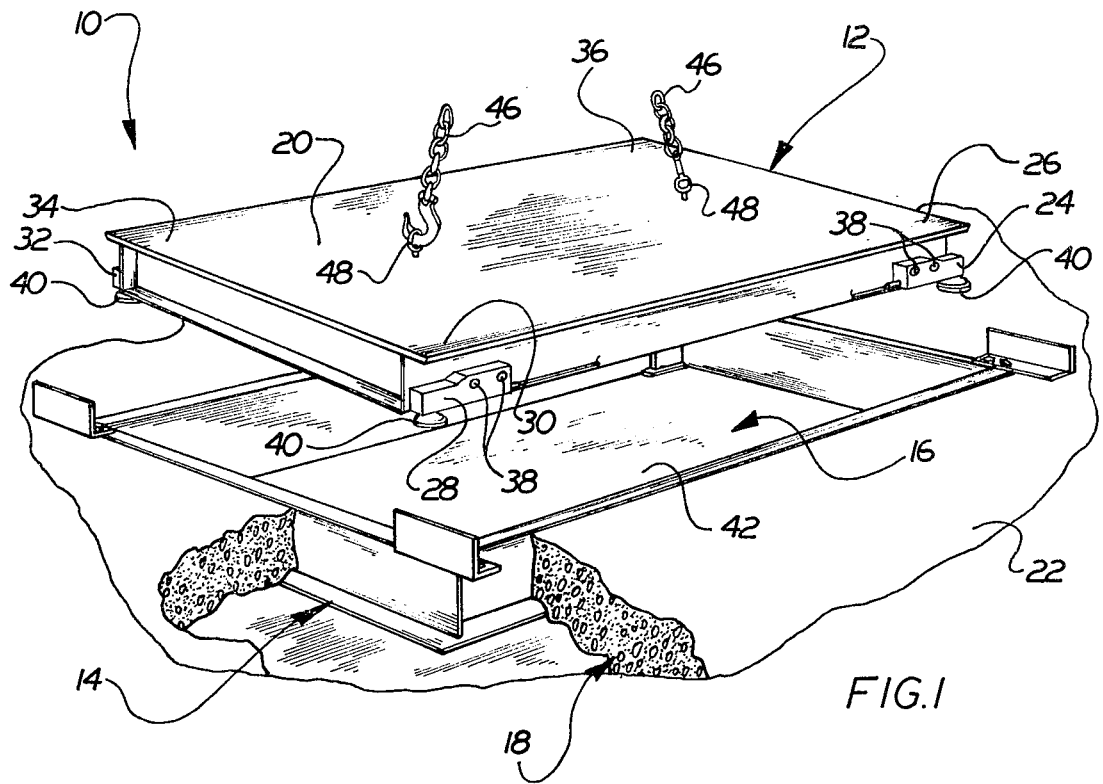
FIG. 1 is a pictorial illustration depicting the installation of a platform in a frame of a weighing apparatus.

The installation of a load platform 12 in a frame 14 of a weighing apparatus 10 constructed in accordance with the present invention is illustrated in FIG. 1. The rectangular frame 14 is disposed in a shallow pit 16 formed in a concrete floor 18. When the load platform 12 is received in the frame 14, a flat upper surface 20 is aligned with an upper surface 22 of the floor 18.

A load cell is provided at each of the four corners of the rectangular platform 12. Thus, a load cell 24 is disposed in corner 26, load cell 28 is disposed at a corner 30, a load cell 32 is disposed at a corner 34, and a load cell (not shown) is disposed at a corner 36 of the platform 12. Each of the four load cells is rigidly secured to the platform 12 by mounting means 38 in a manner which is common in the art.

In accordance with a feature of the present invention, each of the identical load cells is provided with a downwardly projecting floating pin or force transmitting member 40. The identical pins 40 engage a flat bottom or support surface 42 of the pit 16 to support the platform 12 with its load surface 20 in a common plane with the surface 22 of the floor 18. Of course, once the load platform 12 has been installed in the frame 14, the chains 46 and screw eyes 48 are disconnected from the load platform to provide a flat upper surface onto which a vehicle can be easily driven.

During the installation of the load platform 12, the floating pins or force transmitting members 40 are retained in recesses formed in the load cells. Thus, the load cell 24 (see FIG. 2) has a rectangular body 52 with a downwardly facing recess 54 adjacent to an outer end of the body 52. During installation of the load platform 12, the floating pin 40 is retained in the downwardly facing recess 54 by a retainer plate or member 58.

When the load platform 12 is installed in the frame 14 (FIG. 3) a circular bottom surface 64 on a base 66 of the floating pin 40 abuttingly engages the bottom surface 42 of the pit 16. The bottom surface 64 of the base 66 is slidable along the concrete support surface 42 to accommodate shifting movement of the load cell 24 in a direction parallel to the support surface 42 due to thermal expansion and other causes. It should be noted that if the pin 40 was fixedly connected with the frame 14, the bottom surface 64 of the pin 40 could not move along the concrete floor or support surface 42 to accommodate shifting movement of the load cell 24 relative to the floor.

A mounting section 70 (FIG. 3) of the floating pin 40 extends upwardly from the base 66 into the downwardly facing recess 54 formed in the load cell 24. The mounting section 70 includes a cylindrical neck or connector section 72 which is connected with a conically tapered section 74 of the base. The conically tapered section 74 of the base is connected with a cylindrical pad or bottom section 76 of the base 66. The pad or bottom section 76 of the base 66 has a diameter which is substantially greater than the diameter of the connector section 72 to distribute the force transmitted between the load cell 24 and the concrete floor 42 of the pit 16 over a relatively large area.

In addition to the connector section 72, the mounting section 70 has a head end portion 80 which is disposed between a flat inner side surface 82 (FIG. 3) of the retainer plate 58 and a flat circular bottom surface 84 of the recess 54. When the downwardly projecting floating pin 70 is not supported by engagement with the floor 42 or other surface, an annular bottom side surface 88 of the head end section 80 engages the flat major side surface 82 of the retainer plate 58 in the manner shown in FIG. 2 to hold the floating pin 40 in the recess 54. Therefore, during installation of the load platform 12 (see FIG. 1) the floating pins 40 are held in the downwardly facing recess 54 in the associated load cells by retainer plates 58. Since the pins are held in the downwardly facing load cell recesses, it is not necessary to align the pins with the recesses as the platform is installed.

The head end section 80 of the floating pin 40 has an upper surface 92 (FIG. 3) which engages the bottom surface 84 of the recess 54 to transmit a load between the floating pin 40 and the load cell 24. Thus, when a vehicle is driven onto the load platform 12 (FIG. 1) the load is transmitted downwardly to the four load cells at the corners 26, 30, 34 and 36 of the platform. The load is then transmitted from the cells to the floor 42 of the pit 16 through the downwardly projecting pins or force transmitting members 40.

It is contemplated that the weighing apparatus 12 may be installed in pits 16 (see FIG. 1) having bottom surfaces which are uneven. The unevenness of the bottom surface or floor 42 of the pit may be intentional in order to provide for the drainage of water or could be unintentional. In either case, tilting movement can occur between the downwardly extending pins and the load cells to compensate for the unevenness in the floor 42. Thus, the upper surface 92 of the floating pin 40 (see FIG. 3) has a configuration corresponding to the configuration of a portion of a sphere. The spherical surface 92 is disposed in abutting engagement with the flat circular bottom surface 84 of the recess 54. The head end portion 80 has a cylindrical outer side surface 96 which is spaced from a cylindrical side surface 98 of the recess 54 to accommodate sidewise tilting movement between the floating pin 40 and the load cell 24. Of course, this limited sidewise tilting movement of the pin 40 relative to the load cell 24 is facilitated by the spherical configuration of the upper surface 92 of the pin 40.

Figure 4:
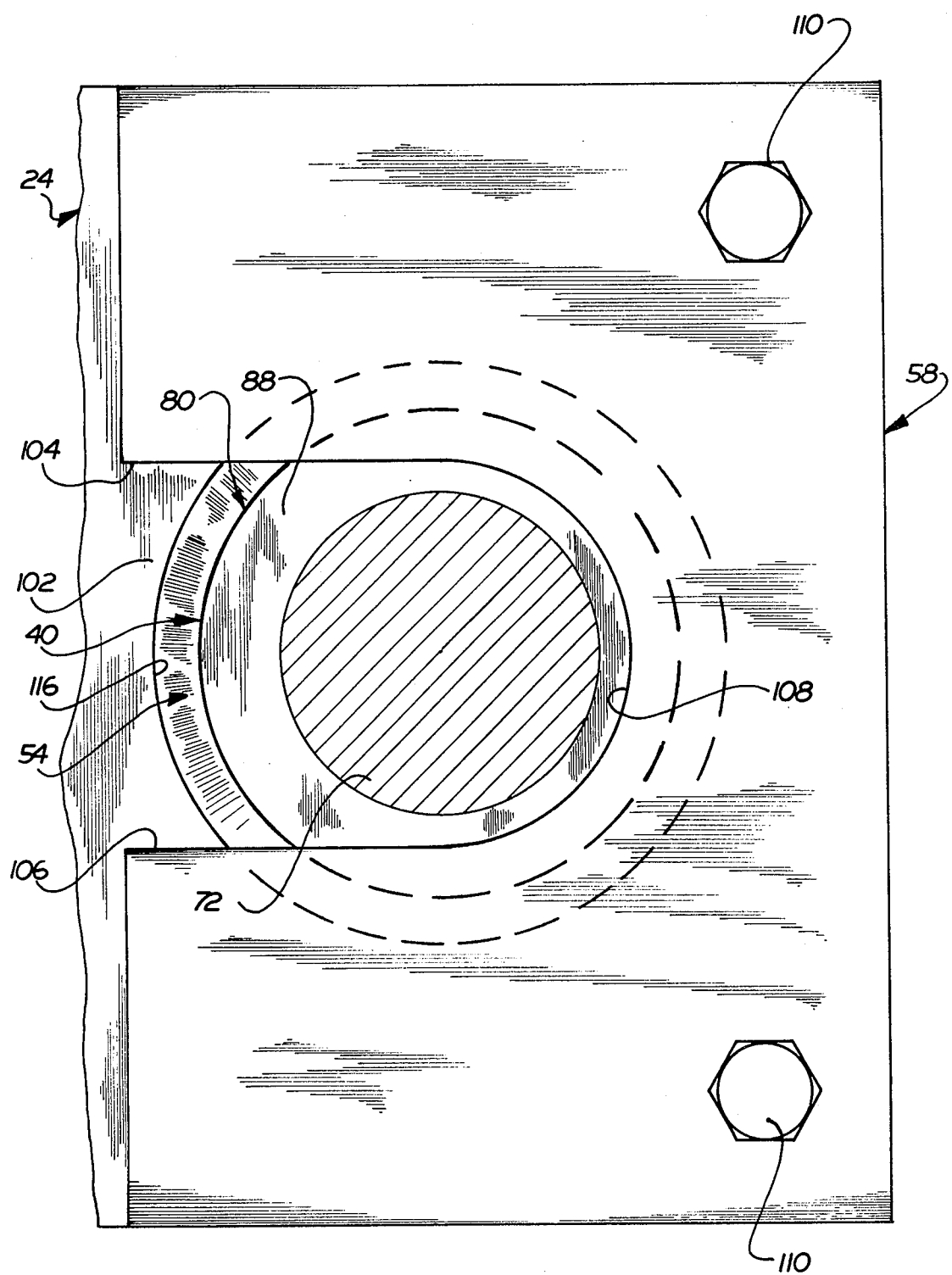
FIG. 4 is a plan view, taken generally along the line 4—4 of FIG. 3, illustrating the construction of the retainer plate which holds the floating pin in the recess in the load cell.

The connector section 72 extends through a generally U-shaped slot 102 (see FIG. 4) formed in the retainer plate 58. It should be noted that the slot 102 is defined by a pair of longitudinally extending side or leg surfaces 104 and 106, which are interconnected by an arcuate bight surface 108. The semi-circular surface 108 has a diameter which is slightly greater than the diameter of the cylindrical connector section 72.

Figure 3:
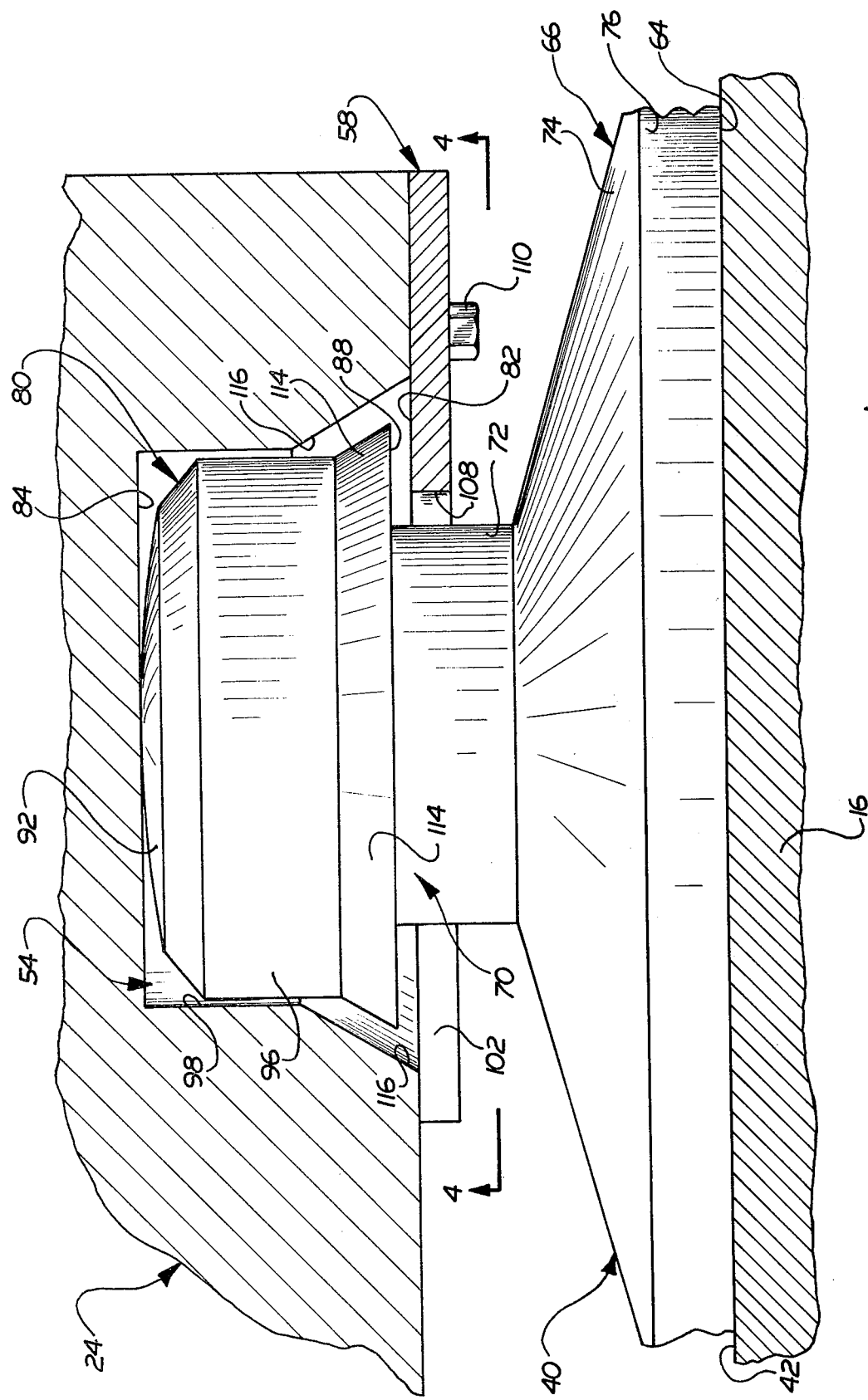
FIG. 3 is an enlarged fragmentary view illustrating the manner in which the floating pin of FIG. 2 engages a floor or support surface when platform of FIG. 1 is installed in the frame.

The annular bottom surface 88 of the head end portion 80 of the pin 40 has an outside diameter which is greater than the distance between the two leg surfaces 104, 106 of the slot 102. This prevents movement of the head end portion 80 through the slot. The retainer plate 58 is fixedly connected with the load cell 24 by a plurality of bolts 110. The head end portion 80 of the floating pin 40 flairs outwardly (see FIG. 3) to the annular bottom surface 88 to thereby tend to maximize the radial extent of the bottom surface. Thus, the annular downwardly facing end surface 88 of the head end portion 80 is connected with the cylindrical side surface 96 by a conical upwardly sloping side surface 114 (FIG. 3). The recess 54 is provided with a similar conical upwardly sloping side surface 116 which extends generally parallel to the surface 114 to receive the outwardly flaring lower portion of the head end section 80.

In view of the foregoing description it is apparent that the present invention relates to a new and improved weighing apparatus 10 having a platform 12 with a plurality of load cells 24, 28, 32. Each of the load cells has a downwardly facing opening 54 in which a floating pin or force transmitting member 40 is received. The floating pin 40 has a relatively large base or pressure pad 66 which directly engages a support surface 42 and is slidable along the support surface to accommodate shifting movement of the platform 12 relative to the support surface. In addition, the floating pin 40 has an arcuate upper surface 92 which abuttingly engages the bottom 84 of the recess 54 in the load cell to accommodate tilting movement between the load cell and the pin.

Figure 2:
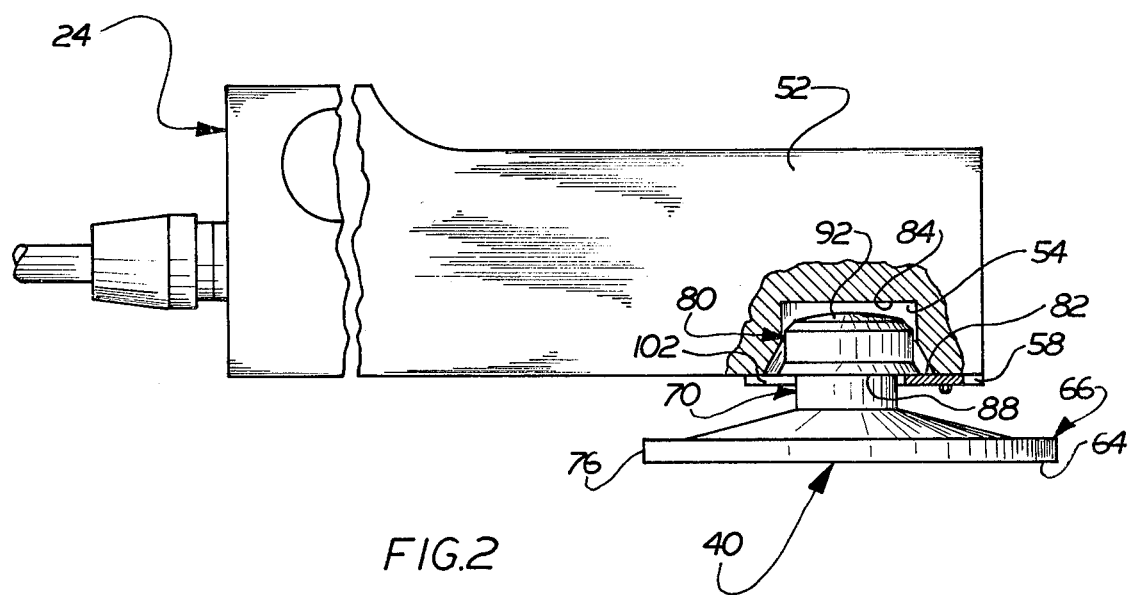
FIG. 2 is an enlarged and partially broken away elevational view of a load cell having a downwardly facing recess in which a floating pin or force transmitting member is held by a retainer plate.

In accordance with one feature of the present invention, a retainer member 58 is provided to hold a mounting section 70 of the floating pin 40 in the downwardly facing recess 54 in the load cell when the base 66 of the pin is spaced from a support surface (FIG. 2). This eliminates the necessity of aligning the pins 40 with the recesses 54 in the load cells during installation of the platform 12 in the frame 14.

Having described one specific preferred embodiment of the invention, the following is claimed:

1. An apparatus for use in weighing a load, said apparatus comprising a load cell having a downwardly facing recess, force transmitting means projecting downwardly from said load cell for transmitting force between said load cell and a support surface, said force transmitting means including a force transmitting member having a relatively large base with a lower surface adapted to slidably engage the support surface to enable said force transmitting member to move along the support surface upon movement of said load cell in a direction which is generally parallel to the support surface, said force transmitting member having a mounting section extending upwardly from said base into the recess in said load cell, said mounting section having an arcuate end surface which abuttingly engages a bottom surface of said recess to facilitate tilting movement between said load cell and said force transmitting member, retainer means connected with said load cell and abuttingly engaging at least a portion of said mounting section in said recess when said lower surface of said base is spaced from the support surface, and being spaced from said mounting section when said lower surface of said base engages the support surface.

2. An apparatus as set forth in claim 1 wherein said retainer means includes a retainer member having surface means for defining an opening in said retainer member and connector means for fixedly connecting said retainer member with said load cell, said mounting section having a head end portion disposed in said recess and a connector portion extending from said head end portion through said opening in said retainer member to said base, said head end portion of said mounting section having a cross sectional area which is greater than the area of the opening in said retainer member to block movement of said head end portion through the opening in said retainer member.

3. An apparatus as set forth in claim 1 wherein said mounting section includes surface means for engaging a side surface of the recess in said load cell to limit tilting movement between said load cell and said force transmitting member.

4. An apparatus as set forth in claim 1 wherein said load cell has a bottom side surface, said recess including a side surface which intersects said bottom surface of said load cell to define a downwardly facing opening to said recess, said retainer means including a retainer member having an upper side surface which is disposed in abutting engagement with said bottom surface of said load cell and which extends across a portion of the opening to said recess and connector means for fixedly connecting said retainer member to said load cell, said mounting section including surface means for engaging said upper side surface to said retainer member to limit downward movement of said force transmitting member when said lower surface of said base is spaced from the support surface.

5. An apparatus as set forth in claim 1 further including a platform and a plurality of said load cells connected with said platform.

* * * * *